United States Patent
Fan et al.

(10) Patent No.: US 6,609,021 B1
(45) Date of Patent: Aug. 19, 2003

(54) PULMONARY NODULE DETECTION USING CARTWHEEL PROJECTION ANALYSIS

(75) Inventors: Li Fan, Middlesex County, NJ (US); Jianzhong Qian, Middlesex County, NJ (US); Guo-Qing Wei, Middlesex County, NJ (US)

(73) Assignee: Siemens Corporate Research, Inc., Princeton, NJ (US)

( * ) Notice: Subject to any disclaimer, the term of this patent is extended or adjusted under 35 U.S.C. 154(b) by 0 days.

(21) Appl. No.: 10/151,661

(22) Filed: May 20, 2002

(51) Int. Cl.[7] .................................................. A61B 5/05
(52) U.S. Cl. ............................ 600/425; 382/131; 378/4
(58) Field of Search ......................... 600/425; 382/131; 378/4, 15, 21, 25

(56) References Cited

U.S. PATENT DOCUMENTS 5,598,453 A  *  1/1997  Baba et al. .................. 378/146
5,987,094 A  *  11/1999  Clarke et al. .................. 378/62

* cited by examiner

Primary Examiner—Marvin M Lateef
Assistant Examiner—Barry Pass
(74) Attorney, Agent, or Firm—Donald B. Paschburg

(57) ABSTRACT

A method for automatic detection of lung nodules in high-resolution multi-slice CT images by using cartwheel projection analysis is disclosed. The projection analysis employs weighted area curves obtained from a series of 2-dimensional cutting planes rotated around a defined axis in the volume of interest. Nodules are detected if the shape analysis of the weighted area curves meets a set of test-criteria.

19 Claims, 9 Drawing Sheets

PULMONARY NODULE DETECTION USING CARTWHEEL PROJECTION ANALYSIS

FIELD OF THE INVENTION

The present invention relates to computer-aided diagnosis (CAD) and, in particular, to a CAD method using cartwheel projection analysis to detect lung nodules.

BACKGROUND OF THE INVENTION

Lung cancer has been reported as the second most commonly diagnosed cancer for both men and women, as well as the leading cause of cancer death in the United States. Although the overall cure rate for lung cancer remains quite low, the five-year survival rate for lung cancer detected and treated at an early stage is promising. Clearly, then, it would be highly desirable to detect lung cancer at an early stage.

Unfortunately, routine chest X-ray is often unsuccessful in detecting lung cancer at an early stage. However, recent advances in computerized tomography (CT) have made it feasible to detect lung nodules that otherwise would not be detected using routine chest X-ray. In CT scanning, X-ray beams are directed at an object of interest from various angles via a rotating device to obtain cross-sectional images (image slices) of lung tissue.

Multi-slice high resolution computerized tomography (MSHRCT) scanning provides a way in which nodules from 2 to 30mm or so in diameter can be imaged. However, the large amount of data presents formidable challenges to radiologists. A typical multi-slice high-resolution scan with slice thickness of 1 to 1.5 mm may have 300 or more image slices. If MSHRCT for lung cancer screening becomes widespread, there will be a tremendous demand for such examinations. It is both time-consuming and impractical for radiologists to study every single slice image.

Automatic nodule detection has attracted tremendous efforts recently. But automatic nodule detection methods often fail to detect nodules attached to blood vessels and have the further drawback of having a high false positive rate. Usually, nodules appear in slice images as nearly circular-shaped opacities, which are similar to cross-sections of vessels. Conventional automatic nodule detection methods have had great difficulty dealing with the subtlety of nodules and the camouflaging effects of normal structures.

Accordingly, it would be desirable and highly advantageous to have a computer aided diagnosis technique for detecting lung nodules that avoids the problems associated with conventional methods.

SUMMARY OF THE INVENTION

A technique is disclosed for automated detection of lung nodules, so that radiologists can be freed from the heavy burden of reading through hundreds of image slices and also so that lung nodule detection can be more accurate and less time consuming.

According to various embodiments of the present invention, cartwheel projection of image slices is performed to obtain a series of slices at different angles centered at the structure of interest. When two-dimensional images are rotated in cartwheel fashion, it is generally much easier to discover the three-dimensional shape of an object and whether it has any connecting blood vessels.

Computer analysis can be performed on the cartwheel projection slices to determine whether they show the characteristics of a lung nodule. This analysis may include shape analysis on certain cartwheel projection slices automatically selected. For each of these cartwheel projection slices, the principle axis of the object of interest can be computed by eigen-vector analysis, and then curves of the sizes/areas of the object of interest along the principle axes are created. Shapes of these curves are analyzed to determine if the object of interest is a nodule.

According to a first aspect of the invention, there is provided a method for detecting lung nodules using cartwheel projection analysis of an object of interest in a set of volumetric image data. The method includes the step of creating a set of cartwheel projection image slices by applying cartwheel projection centered at the object of interest in the set of volumetric image data. A subset of the cartwheel projection image slices is analyzed to determine whether the characteristics of a lung nodule are indicated. If so, the object of interest is identified as a lung nodule.

According to a second aspect of the invention, the method also includes the steps of extracting the object of interest for each of the cartwheel projection image slices. The circularity values for each of the extracted object of interest are then determined. The subset of cartwheel image slices is defined to include the cartwheel projection image slices with the M lowest circularity values.

According to a third aspect of the invention, the step of analyzing a subset of the cartwheel projection image slices includes creating weighted area curves for the cartwheel projection image slices in the subset of image slices with the M lowest circularity values. The shapes of the weighted area curves are analyzed to determine whether they indicate the characteristics of a lung nodule.

According to a fourth aspect of the invention, a lung nodule mask is created using cartwheel projection image slices having the N highest circularity values. The shapes of the weighted area curves are examined along the position estimated by the lung nodule mask. If the shapes of the weighted area curves along the position estimated by the lung nodule mask are Gaussian, the object of interest is considered to be a lung nodule.

According to a fifth aspect of the invention, creating the weighted area curves includes first determining the principle axis of the object of interest on each of the cartwheel projection image slices with the M lowest circularity values. Once the principle axes are determined, the sizes/areas of the object of interest along the principle axes are measured and the weighted area curves can be generated.

According to a sixth aspect of the invention, the object of interest is considered to be a lung nodule if the cartwheel projection slices with the M lowest circularity values have circularity values above a predefined threshold value.

According to a seventh aspect of the invention, the object of interest is considered not to be a lung nodule if the cartwheel projection slices with the N highest circularity values have circularity values below a predefined threshold value.

According to an eighth aspect of the invention, the volumetric image data is obtained from a multi-slice high resolution CT (MSHRCT) scan.

According to a ninth aspect of the invention, the rotation angles for the cartwheel projection are preset.

These and other aspects, features and advantages of the present invention will become apparent from the following detailed description of preferred embodiments, which is to be read in connection with the accompanying drawings.

DESCRIPTION OF PREFERRED EMBODIMENTS

The present invention is directed to a computer-aided diagnosis (CAD) method to detect lung nodules using cartwheel projection analysis. Analysis can be performed on cartwheel projection slices to determine whether they show the characteristics of a lung nodule.

Figure 2:
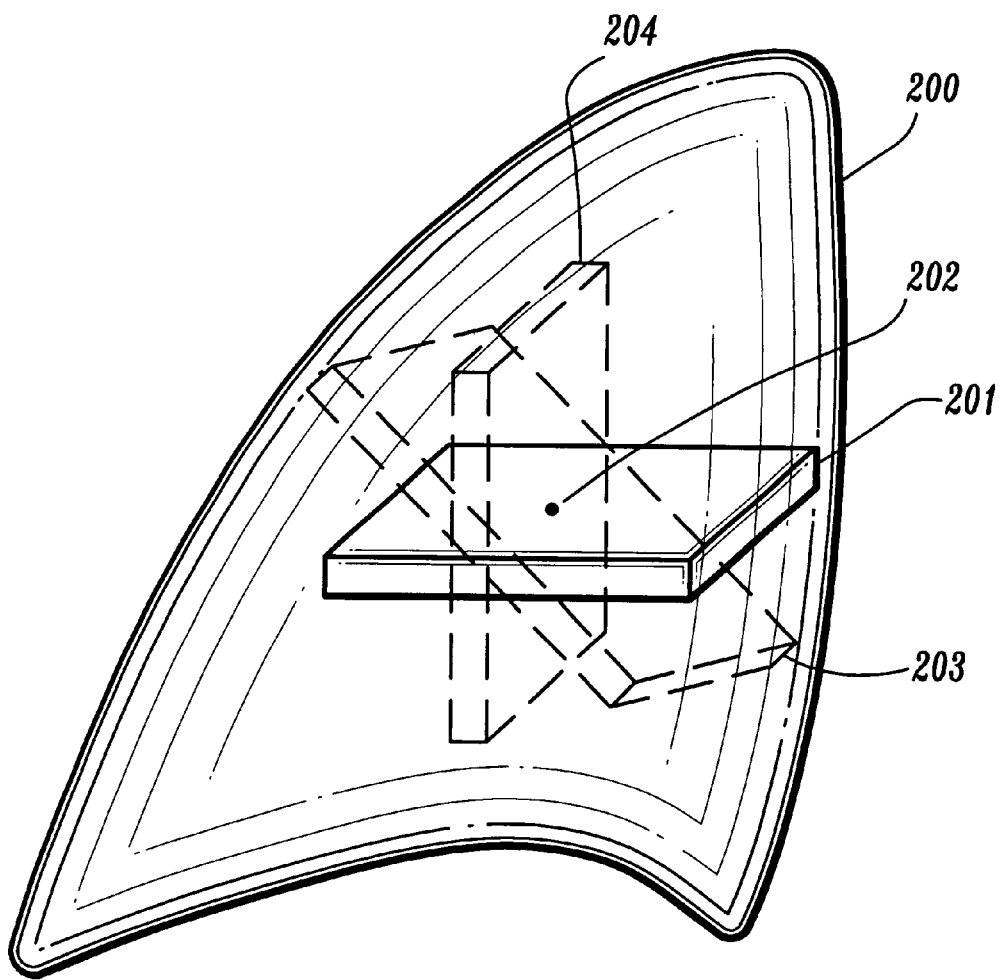
FIG. 2 is a diagram illustrating a cartwheel projection of an image slice centered at an object of interest.

To facilitate a clear understanding of the present invention, illustrative examples are provided herein which describe certain aspects of the invention (e.g., the cartwheel projection shown in FIG. 2). However, it is to be appreciated that these illustrations are not meant to limit the scope of the invention, and are provided herein to illustrate certain concepts associated with the invention.

It is also to be understood that the present invention may be implemented in various forms of hardware, software, firmware, special purpose processors, or a combination thereof. Preferably, the present invention is implemented in software as a program tangibly embodied on a program storage device. The program may be uploaded to, and executed by, a machine comprising any suitable architecture. Preferably, the machine is implemented on a computer platform having hardware such as one or more central processing units (CPU), a random access memory (RAM), and input/output (I/O) interface(s). The computer platform also includes an operating system and microinstruction code. The various processes and functions described herein may either be part of the microinstruction code or part of the program (or combination thereof) which is executed via the operating system. In addition, various other peripheral devices may be connected to the computer platform such as an additional data storage device and a printing device.

It is to be understood that, because some of the constituent system components and method steps depicted in the accompanying figures are preferably implemented in software, the actual connections between the system components (or the process steps) may differ depending upon the manner in which the present invention is programmed.

Figure 1:
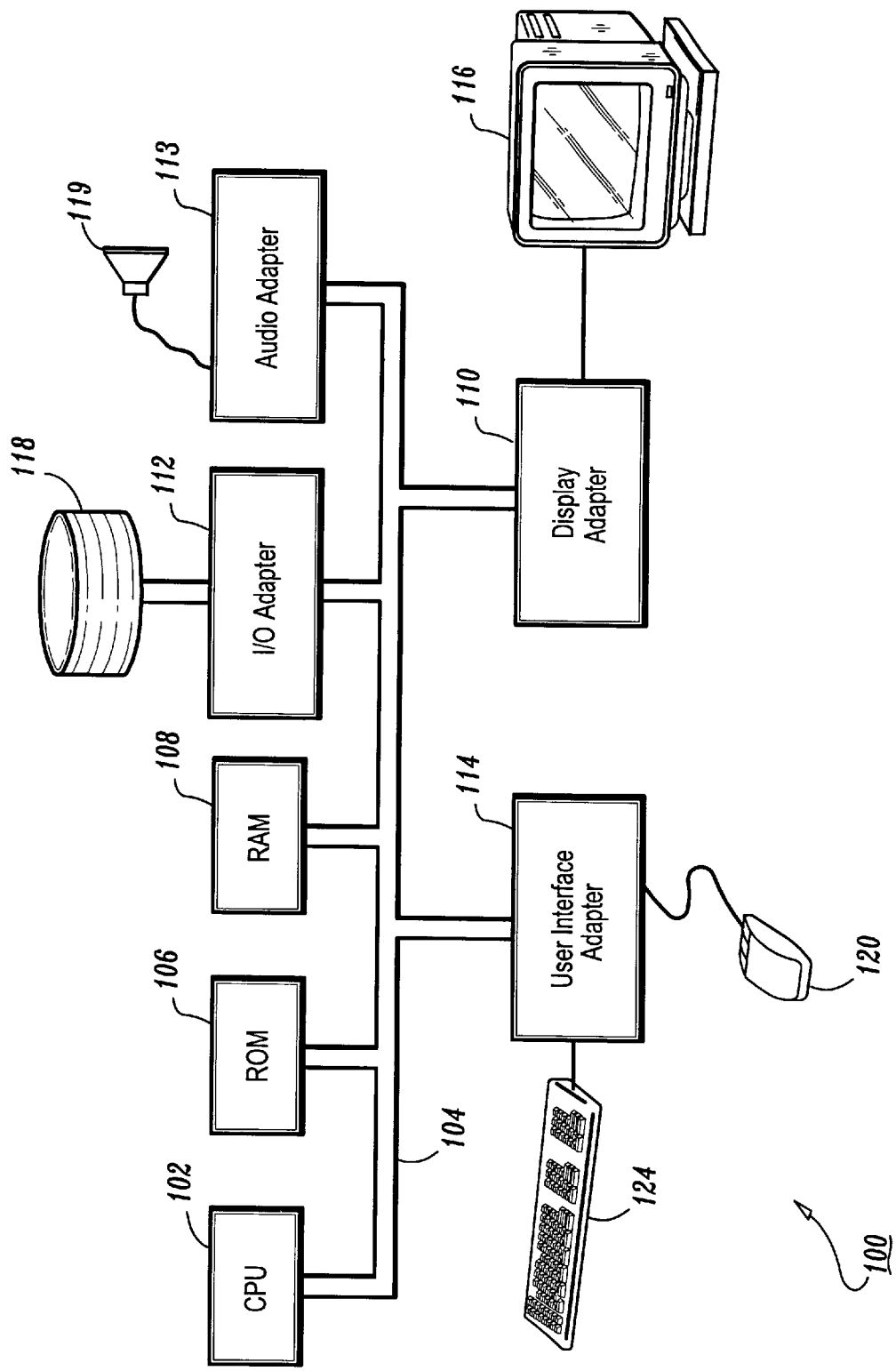
FIG. 1 is a block diagram of a computer processing system to which the present invention may be applied according to an embodiment of the present invention.

FIG. 1 is a block diagram of a computer processing system 100 to which the present invention may be applied according to an embodiment of the present invention. The system 100 includes at least one processor (hereinafter processor) 102 operatively coupled to other components via a system bus 104. A read-only memory (ROM) 106, a random access memory (RAM) 108, a display adapter 110, an I/O adapter 112, an audio adapter 113, and a user interface adapter 114 are operatively coupled to the system bus 104.

A display device 1 16 is operatively coupled to system bus 104 by the display adapter 110. A disk storage device (e.g., a magnetic or optical disk storage device) 118 is operatively coupled to the system bus 104 by the I/O adapter 112. A speaker 119 is operatively coupled to the system bus 104 by the audio adapter 113.

A mouse 120 and a keyboard 124 are operatively coupled to the system bus 104 by the user interface adapter 114. The mouse 120 and the keyboard 124 are used to input and output information to and from the system 100.

Those skilled in the art will recognize that the exemplary computer processing system 100 illustrated in FIG. 1 is not intended to limit the present invention. Those skilled in the art will appreciate that other alternative computing environments may be used without departing from the spirit and scope of the present invention.

FIG. 2 illustrates a cartwheel projection of an object of interest. Each axial image slice that is put through the cartwheel projection is obtained from an image scan of a lung 200 using a CT device (hereinafter the term CT will include a high resolution CT as well as other similar image scanning devices), and is centered at an object of interest, such as a suspicious structure. As depicted in FIG. 2, a spinning projection plane 201 is rotated 180 degrees, around a point of interest 202, and a series of 2D projection of the axial image slice (hereafter called cartwheel projection image slices such as cartwheel projection image slices 203 and 204, are obtained. The rotation angles can be set at predefined intervals, such as, for example, every 5 degrees, in which case 36 individual cartwheel projection image slices would be generated for each input object of interest on a given axial image slice. Likewise, if the interval was set to 1 degree, 180 individual cartwheel projection image slices would be generated for each input object of interest.

Figure 3:
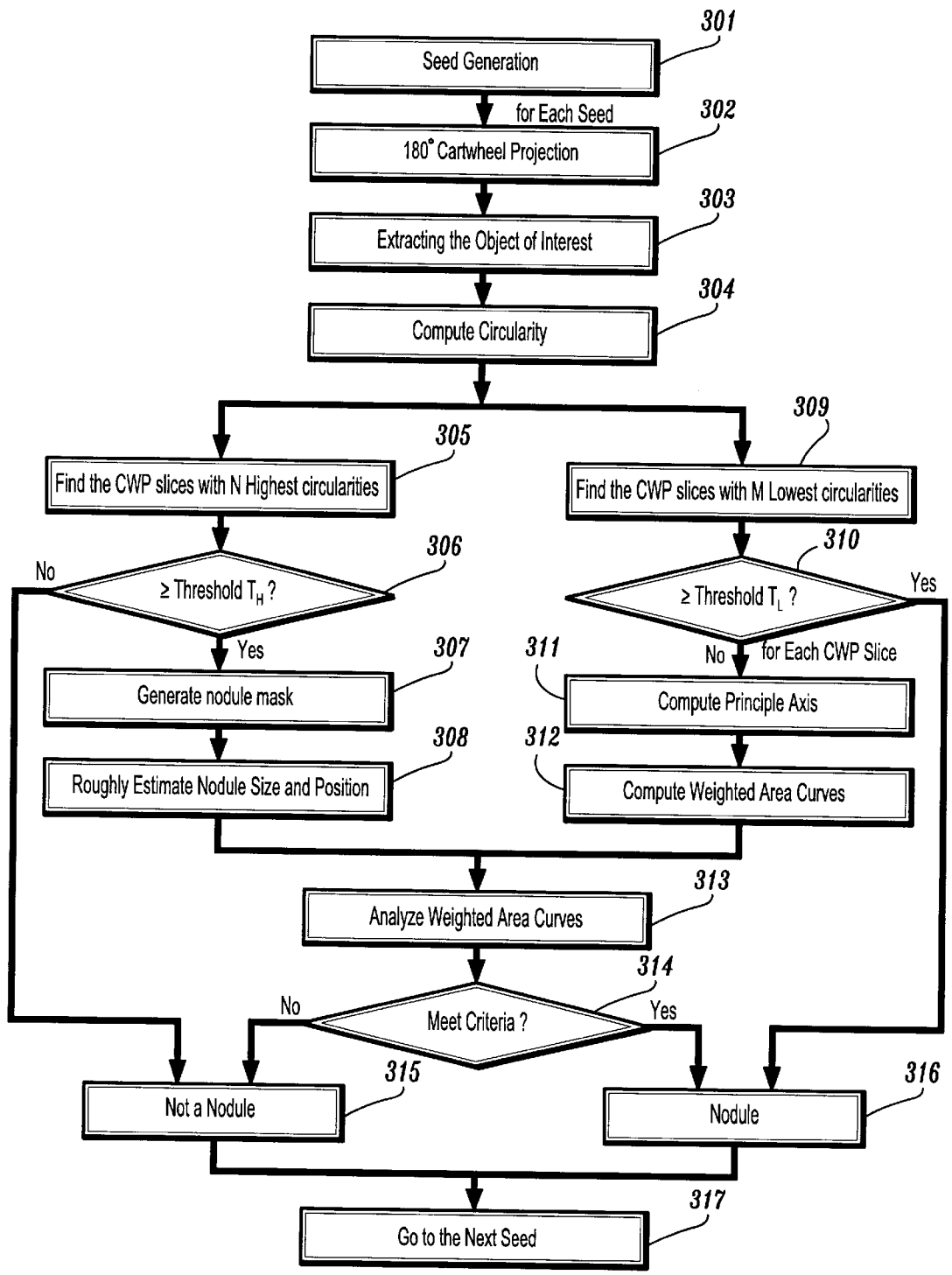
FIG. 3 is a block diagram of a computer-aided diagnosis (CAD) method for automatically detecting lung nodules using cartwheel projection analysis.

FIG. 3 is a block diagram of a computer aided diagnosis method for automatically detecting lung nodules using cartwheel projection analysis.

Initially, a plurality of seed points are generated for the structures of interest to examine in the lung volume (step 301). In general, a seed point indicates a point/voxel in a lung image that warrants closer examination. For example, a seed point may point to a suspicious structure that requires detailed examination.

Because of the anatomical nature of pulmonary nodules, we need to only consider points/voxels whose intensity values are greater than a particular threshold. Moreover, it is recommended that an automatic seed candidate generation algorithm be used in conjunction with the present invention to generate the seed points. Alternatively, seed points may be manually specified, for example, by using a mouse device to select the seed points interactively.

Once the seed points have been generated, a cartwheel projection is applied at each seed point (as depicted in FIG. 2), and the resulting two-dimensional cartwheel projection image slices are stored for further analysis (step 302).

The next step is to extract the object of interest from each cartwheel projection image slice (step 303). This may be accomplished by converting the image from grayscale format into binary format, using a relatively low threshold value so that even weak blood vessels can keep their connectivity. An example of such an intensity threshold value is −624 Hu. All of the surrounding structures not connected to the object of interest may be set to background.

The geometric characteristics of the objects of interest on each (binary) cartwheel projection image slice are then examined (step 304). More particularly, the circularity is computed for the object of interest on each cartwheel projection image slice using the following formula:

$$\text{circularity} = \frac{\text{area of the object of interest}}{\text{perimeter of the object of interest}}$$

It is to be appreciated that the higher the circularity value, the rounder the shape of an object.

Next, the binary cartwheel projection image slices having the N highest circularities are obtained (step 305). This could be accomplished, for example, by sorting the binary cartwheel projection image slices in circularity value order and selecting the top N slices.

A determination is made as to whether the N highest circularities are lower than a predefined threshold $T_H$ (step 306). If the N highest circularities are lower than the threshold $T_H$, then the seed under consideration is not considered to be a nodule since it would be not round enough (step 315). Otherwise, a nodule mask is generated by ORing the N corresponding binary cartwheel projection image slices (step 307). Using the nodule mask, the potential nodule size and position of the potential nodule can be estimated (step 308).

The cartwheel projection image slices with the M lowest circularities are then determined (step 309). This may be done by examining the sorted slices and selecting the ones with the M lowest circularity values.

A determination is made as to whether the cartwheel projection image slices with the M lowest circularies have circularity values above a predetermined threshold value $T_L$ (step 310). If they are above the threshold $T_L$, it is immediately determined that the structure of interest is a nodule (step 316) because of its round shape. Otherwise the weighted area curves for each cartwheel projection image slice are calculated. The first step in determining a weighted area curve is to compute the principle axis A by eigen-vector analysis of the matrix $$A = E[(x - \mu)(x - \mu)^T]$$
$$= \begin{bmatrix} E_{XX} & E_{XY} \\ E_{EY} & E_{YY} \end{bmatrix},$$

where $x=[x, y]^T$ represents a pixel of the object of interest, and $\mu=[\bar{x}, \bar{y}]$ represents the centroid of the object (step 311).

Next, area weighted curves are computed by measuring the width or area of the object along the direction perpendicular to the principle axis to obtain each of the area curves (step 312). In this step, the intensities of the pixels may also be normalized and recorded. Optionally, median filtering may be applied to the area curve so that the artifact caused by segmentation is reduced and the area curve is smoothed. The area curve can then be weighted by the normalized intensities so that a more reasonable interpretation of the anatomy can be achieved.

At this point, we would be in a position to analyze the weighted area curves. Representing the shape characteristics of anatomical structures, these weighted area curves exhibit distinct differences in their shape features between the curves of nodules and those of blood vessels. Usually, the weighted area curve of a nodule tends to be Gaussian-shaped, even if the nodule is solitary or attached to a blood vessel, while that of a vessel does not possess such a property. The shape of the weighted area curves are analyzed around the position estimated from the nodule mask (step 313).

A determination is made as to whether the weighted area curves are sufficiently Gaussian-shaped around the position roughly estimated by the nodule mask (step 314) according to a set of criteria. An example of the criteria can be a curve fitting technique. If it is determined that the current seed under examination meets this criteria, it is considered to be a nodule (step 316) and the object under examination is saved. Otherwise, the seed is not considered to be a nodule (step 315).

The next seed can then be processed (step 317). The process iterates until there are no more seeds to be examined.

To better understand the present invention, several examples will now be presented. In the first example, cartwheel projection analysis is performed to detect a nodule attached to vessels. The second example shows how cartwheel projection analysis can be used to distinguish a small weak vessel from a nodule.

A. USING CARTWHEEL PROJECTION ANALYSIS TO DETECT A NODULE ATTACHED TO VESSELS

Figure 4A:
FIG. 4(a) is an axial view of a nodule attached to a vessel.
Figure 4B:
FIG. 4(b) is a 3D surface rendering of a nodule attached to a vessel.

FIGS. 4(a) and 4(b) show an example of a nodule attached to vessels. In FIG. 4(a) an axial view of the nodule is shown, and FIG. 4(b) shows a 3D surface rendering.

Figure 4C:
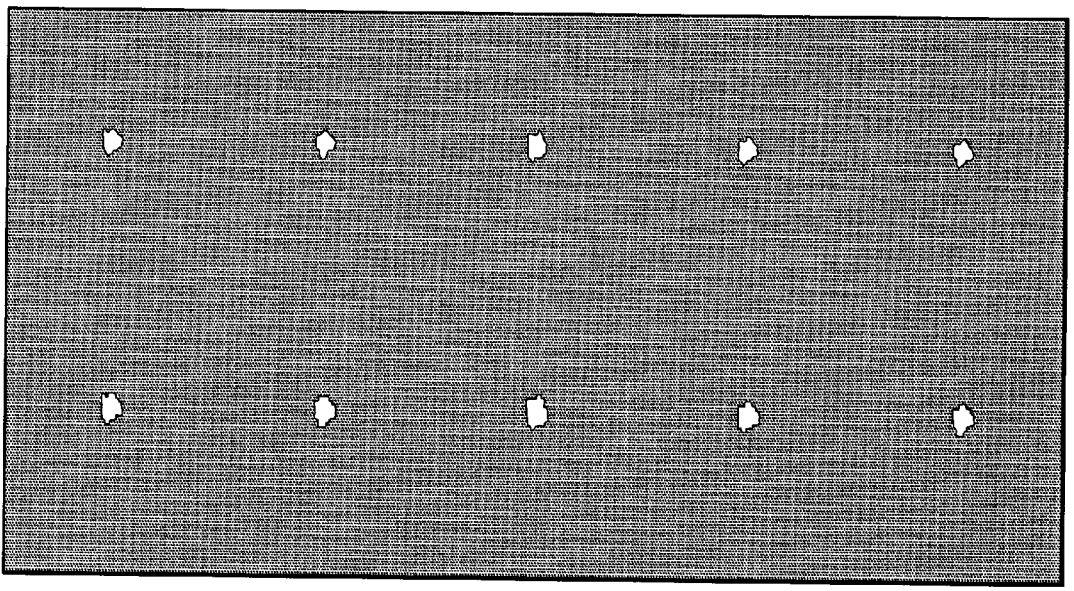
FIGS. 4(c) to 4(e) depict cartwheel projection analysis applied to the detection of a nodule attached to a vessel.
Figure 4D:
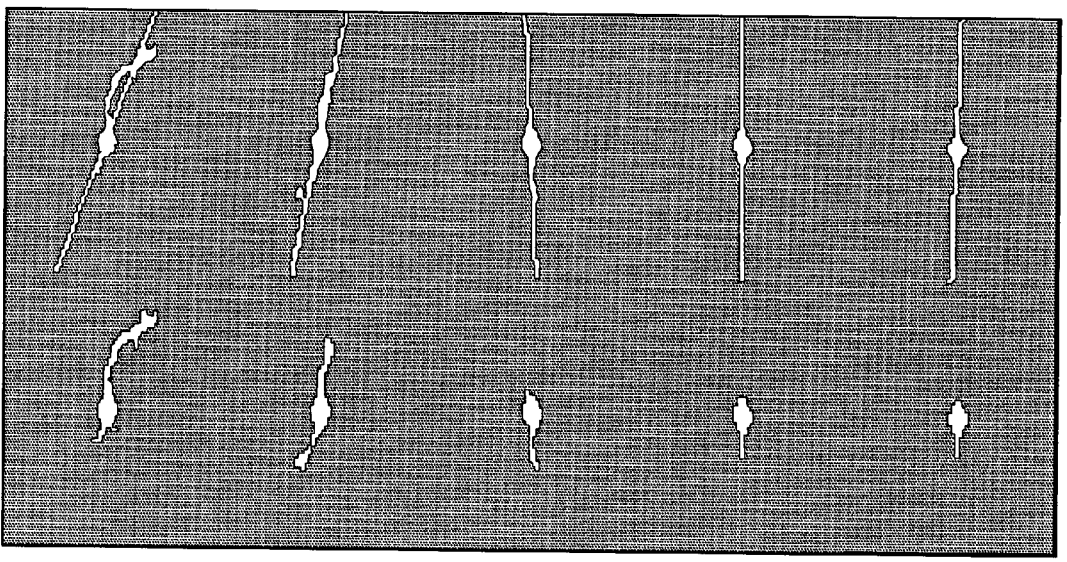

In FIG. 4(c), five original (top row) and binary (bottom row) cartwheel projection image slices with the highest circularities are illustrated. In this example, N would be equal to 5. FIGS. 4(d) illustrates five original and binary cartwheel projection slices with the M lowest circularities. In this example, M would be also equal to 5. The principle axes are indicated.

Figure 4E:
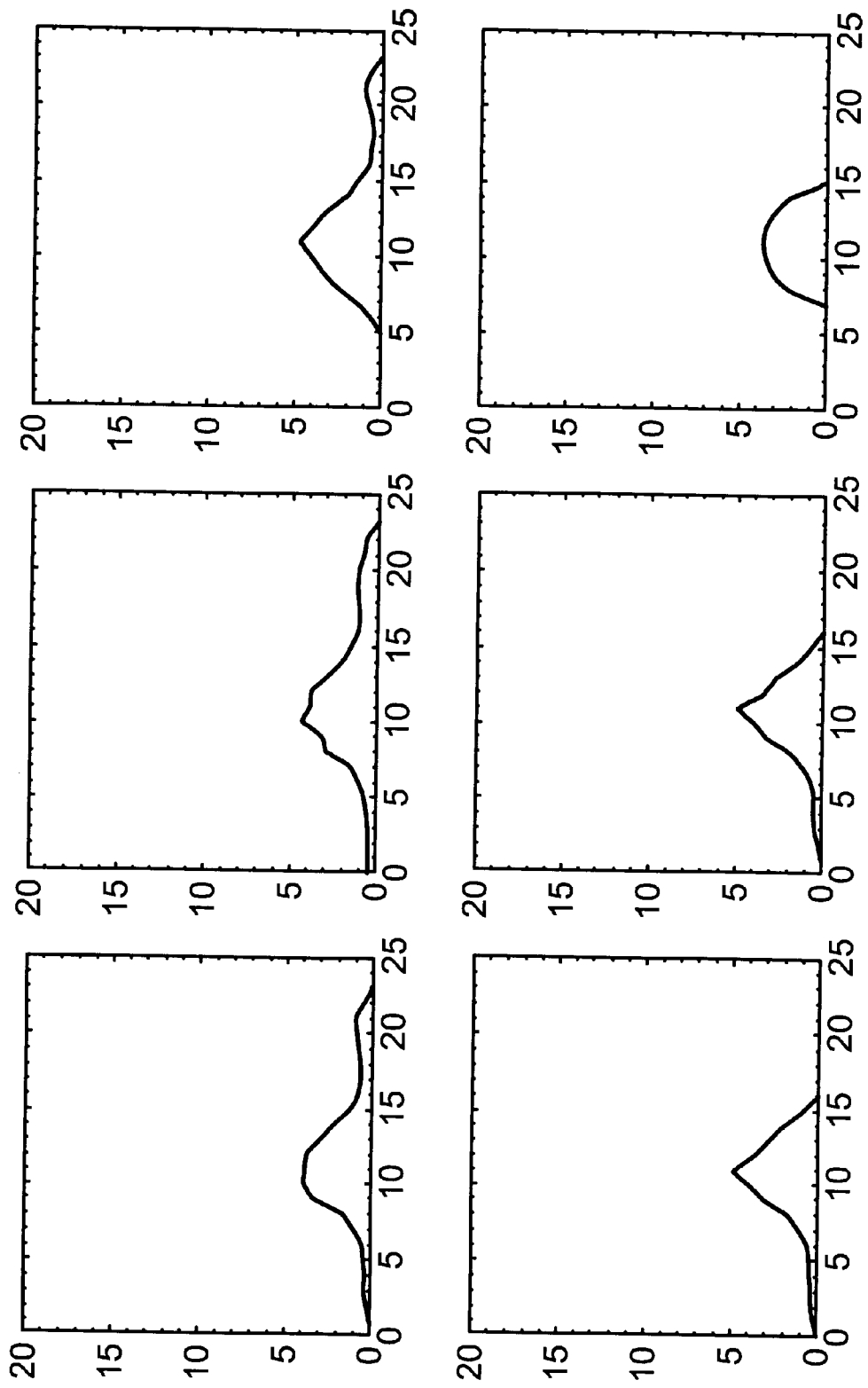

FIG. 4(e) illustrates the weighted area curves of the five cartwheel projection slices with the lowest circularities. The last subimage indicates the nodule mask. Recall that a nodule mask is created from ORing the N binary cartwheel projection slices. Thus, this nodule mask was created from ORing the five binary cartwheel projection slices shown in FIG. 4(c). Note that these weighted area curves shown in FIG. 4(e) appear to be Gaussian around the position roughly estimated from the nodule mask. Since they have this shape, they indicate that the object of interest is a nodule because nodules have this property.

B. USING CARTWHEEL PROJECTION ANALYSIS TO DISTINGUISH A SMALL WEAK VESSEL FROM A NODULE

Figure 5A:
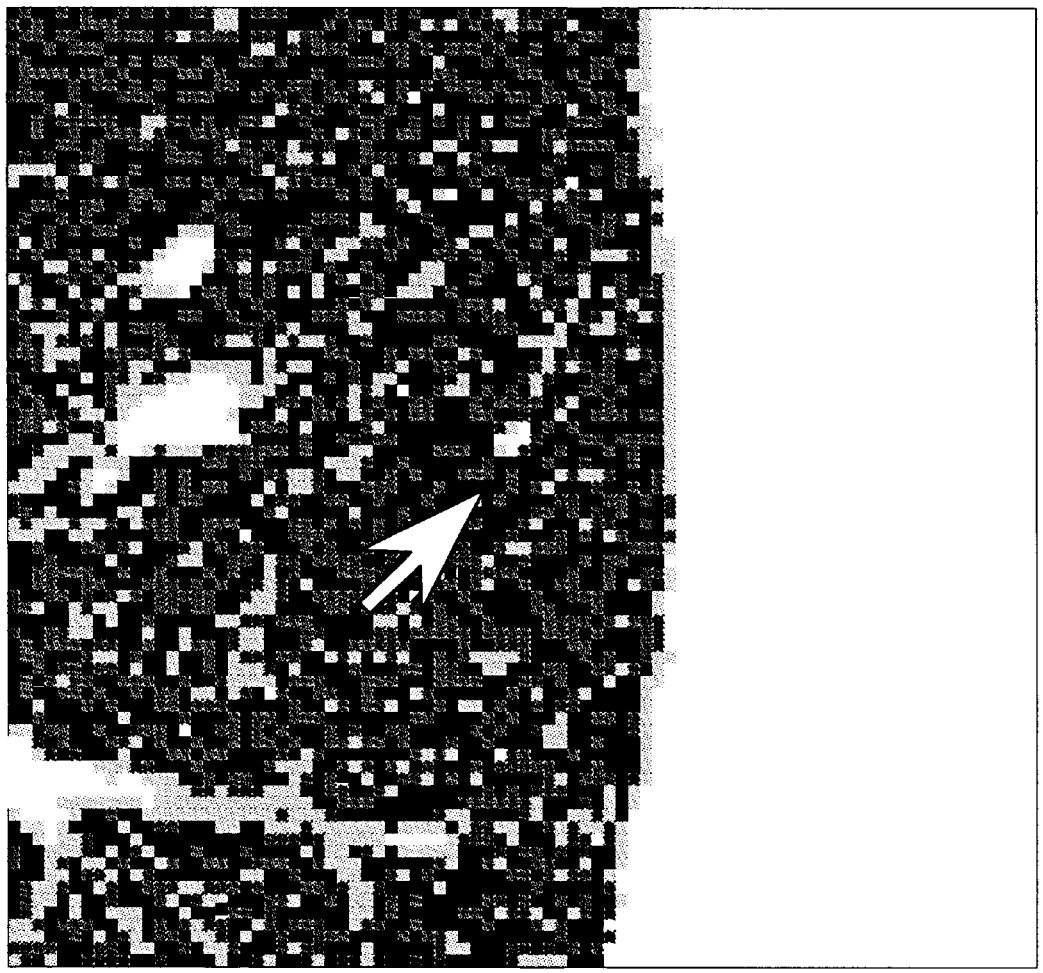
FIG. 5(a) illustrates a small, weak vessel that appears to be a nodule on axial image.

FIG. 5(a) shows an example of a small weak vessel that appears to be a nodule.

Figure 5B:
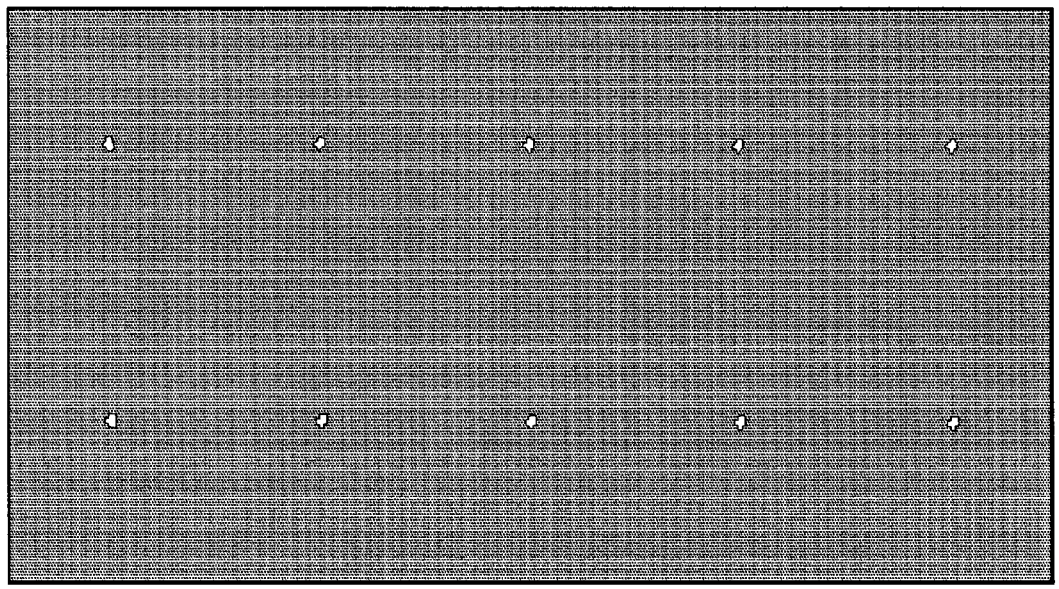
FIGS. 5(b) to 5(d) depict cartwheel projection analysis for distinguishing a small weak vessel from a nodule and thereby eliminating a false positive diagnosis.
Figure 5C:
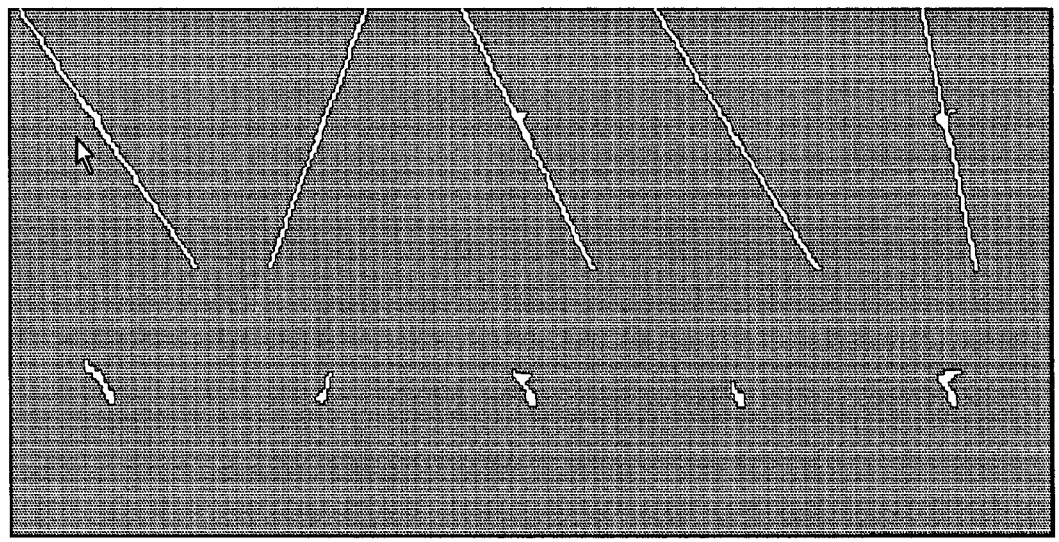

In FIG. 5(b), the five original cartwheel projection slices with the highest circularities are illustrated. FIG. 5(c) shows the five original (top row) and binary (bottom row) cartwheel projection slices with the lowest circularities. The principle axes are indicated. As with the previous example, M and N would are both set to 5.

Figure 5D:
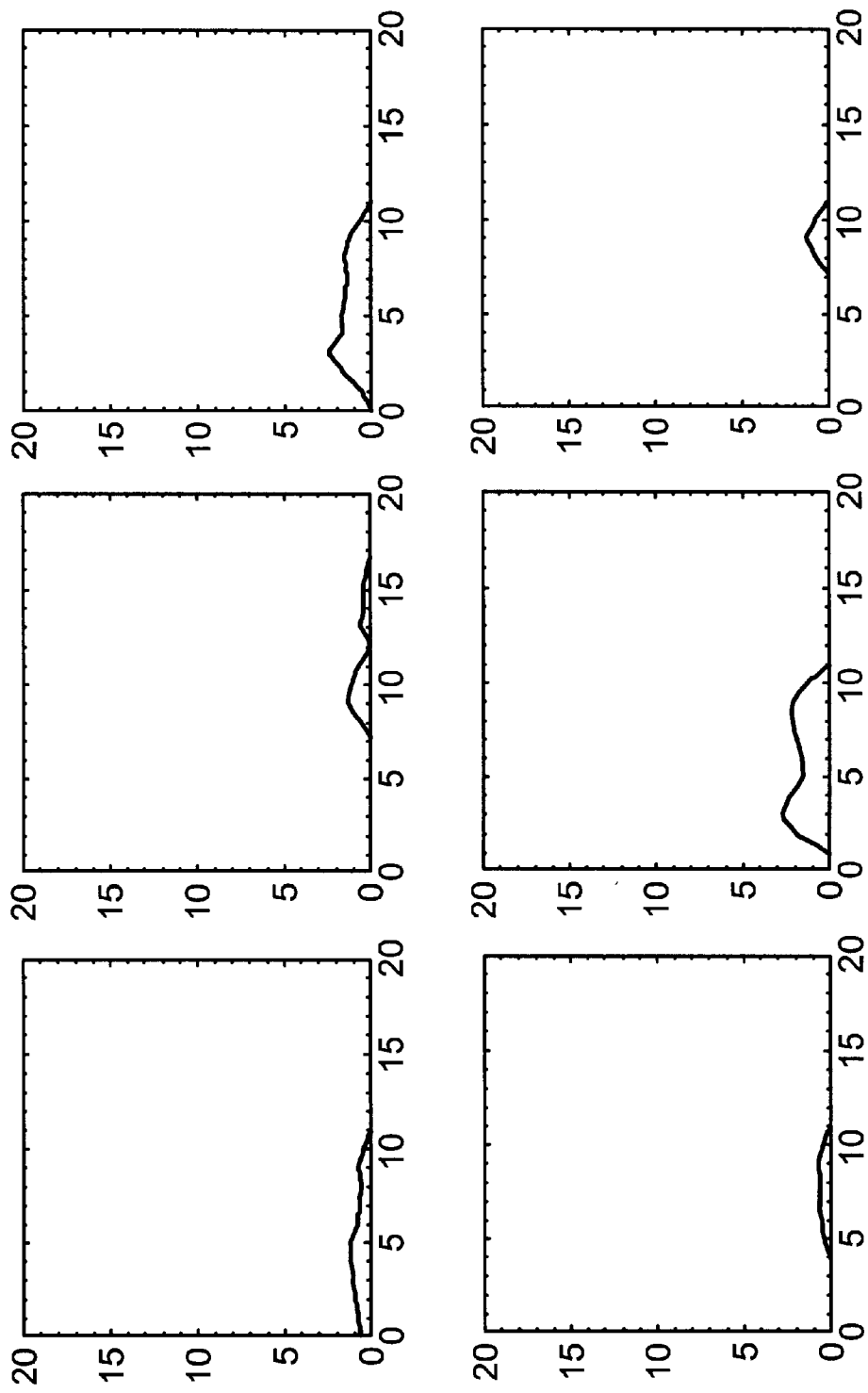

FIG. 5(d) shows the weighted area curves of the five cartwheel projection slices with the lowest circularities. The last subimage indicates the nodule mask that shows the roughly estimated size and position of the object. Note that these weighted area curves appear relatively linear shaped, and are not Gaussian-shaped around the position roughly estimated from the nodule mask. This is an indication that the seed is not a nodule. In this case, since the object of interest as actually a small weak blood vessel, the curves have a linear shape.

The above examples illustrate some of the major advantages of cartwheel projection analysis to automatically detect lung nodules. However, it should be appreciated that these examples are not meant to limit the scope of the present invention. Further, it should be appreciated that in some instances, the present invention will automatically determine the characteristics of an object of interest without using weighted area curves. As previously mentioned, for example, the present invention can detect that an object is a nodule simply if the circularity of the object exceeds a predetermined threshold value, and can also determine that an object is not a nodule if its circularity is below another predetermined threshold value.

Although illustrative embodiments of the present invention have been described herein with reference to the accompanying drawings, it is to be understood that the invention is not limited to those precise embodiments, and that various other changes and modifications may be affected therein by one skilled in the art without departing from the scope or spirit of the invention.

What is claimed is:

1. A method for detecting lung nodules using cartwheel projection analysis of an object of interest in a set of volumetric image data, comprising the steps of:

creating a set of cartwheel projection image slices by applying cartwheel projection centered at the object of interest in the set of axial image slices comprising the volumetric image data;

analyzing a subset of the cartwheel projection image slices to determine whether characteristics of a lung nodule are indicated; and identifying the object of interest as being a lung nodule if it is determined that the characteristics of a lung nodule are indicated.

2. The method of claim 1, further comprising the steps of:

extracting the object of interest for each of the cartwheel projection image slices;

determining a circularity value of each of the extracted object of interest; and defining a subset of cartwheel projection image slices to include the cartwheel projection image slices with M lowest circularity values.

3. The method of claim 2, wherein analyzing the subset of the cartwheel projection image slices includes the steps of:

creating weighted area curves for the cartwheel projection image slices in the subset of image slices with M lowest circularities; and determining whether shapes of the weighted area curves indicate the characteristics of a lung nodule.

4. The method of claim 3, wherein determining whether the shapes of the weighted area curves indicate the characteristics of a lung nodule includes the steps of:

creating a lung nodule mask using cartwheel projection image slices having the N highest circularity values;

examining the shapes of the weighted area curves obtained on the cartwheel projection slices with the M lowest circularity values along a position estimated by the lung nodule mask; and identifying the object of interest as a lung nodule if the shapes of the weighted area curves along the position estimated by the lung nodule mask are Gaussian.

5. The method of claim 3, wherein creating the weighted area curves includes the steps of:

determining a principle axis of the object of interest on each of the cartwheel projection image slices with the M lowest circularities;

measuring the sizes/areas of the object of interest along the principle axes; and generating the weighted area curves.

6. The method of claim 1, wherein analyzing the subset of the cartwheel projection image slices includes considering the object of interest to be a lung nodule if the cartwheel projection image slices with the M lowest circularity values have circularity values above a predefined threshold value.

7. The method of claim 1, wherein analyzing the subset of the cartwheel projection image slices includes considering the object of interest not to be a lung nodule if the cartwheel projection image slices with the N highest circularity values have circularity values below a predefined threshold value.

8. The method of claim 1, wherein the volumetric image data is obtained from a multi-slice high resolution CT scan.

9. The method of claim 1, wherein rotation angle intervals for the cartwheel projection are preset.

10. A program storage device readable by a machine, tangibly embodying a program of instructions executable on the machine to perform method steps for detecting lung nodules using cartwheel projection analysis of an object of interest in a set of volumetric image data, the method steps comprising:

creating a set of cartwheel projection image slices by applying cartwheel projection centered at the object of interest in the set of volumetric image data;

analyzing a subset of the cartwheel projection image slices to determine whether characteristics of a lung nodule are indicated; and identifying the object of interest as being a lung nodule if it is determined that the characteristics of a lung nodule are indicated.

11. The program storage device of claim 10, further comprising the steps of:

extracting the object of interest for each of the cartwheel projection image slices;

determining a circularity value of each of the extracted object of interest; and defining a subset of cartwheel projection image slices to include the cartwheel projection image slices with M lowest circularity values.

12. The program storage device of claim 11, wherein analyzing a subset of the cartwheel projection image slices includes the steps of:

creating weighted area curves for the cartwheel projection image slices in the subset of image slices with M lowest circularities; and determining whether shapes of the weighted area curves indicates the characteristics of a lung nodule.

13. The program storage device of claim 12, wherein determining whether the shapes of the weighted area curves indicates the characteristics of a lung nodule includes the steps of:

creating a lung nodule mask using cartwheel projection image slices having the N highest circularity values;

examining the shapes of the weighted area curves obtained on the cartwheel projection slices with the M lowest circularity values along a position estimated by the lung nodule mask; and identifying the object of interest as a lung nodule if the shapes of the weighted area curves along the position estimated by the lung nodule mask are Gaussian.

14. The program storage device of claim 12, wherein creating the weighted area curves includes the steps of:

determining a principle axis of the object of interest on each of the cartwheel projection image slices with the M lowest circularities;

measuring the sizes/areas of the object of interest along the principle axes; and generating the weighted area curves.

15. The program storage device of claim 10, wherein analyzing the subset of the cartwheel projection image slices includes considering the object of interest to be a lung nodule if the cartwheel projection image slices with the M lowest circularity values have circularity values above a predefined threshold value.

16. The program storage device of claim 10, wherein analyzing the subset of the cartwheel projection image slices includes considering the object of interest not to be a lung nodule if the cartwheel projection image slices with the N highest circularity values have circularity values below a predefined threshold value.

17. The program storage device of claim 10, wherein the volumetric image data is obtained from a multi-slice high resolution CT scan.

18. The program storage device of claim 10, wherein rotation angle intervals for the cartwheel projection are preset.

19. A lung nodule detecting apparatus for assisting in a diagnosis of lung cancer, comprising:

an input unit for obtaining a set of cartwheel projection image slices associated with an object of interest;

an analyzer for performing cartwheel projection analysis on the set of cartwheel projection image slices; and an output unit for identifying whether the object of interest is a lung nodule.

* * * * *